United States Patent [19]

Yokoi et al.

[11] 4,424,967
[45] Jan. 10, 1984

[54] TIMEPIECE APPARATUS HAVING GAME FUNCTION

[75] Inventors: Gunpei Yokoi, Kyoto; Satoru Okada, Osaka, both of Japan

[73] Assignee: Nintendo Co., Ltd., Kyoto, Japan

[21] Appl. No.: 329,383

[22] Filed: Dec. 10, 1981

[30] Foreign Application Priority Data

Dec. 26, 1980 [JP] Japan ................................. 55-186658

[51] Int. Cl.³ .............................................. A63F 9/00
[52] U.S. Cl. .................................... 273/1 GC; 368/3; 368/10
[58] Field of Search ........................ 368/10, 45, 256, 3; 273/1 E, 138 A, 1 GC

[56] References Cited

U.S. PATENT DOCUMENTS

| | | | |
|---|---|---|---|
| 4,187,671 | 2/1980 | Fatton | 273/138 A |
| 4,188,779 | 2/1980 | Fatton | 273/138 A |
| 4,231,090 | 10/1980 | Fatton | 273/138 A |

FOREIGN PATENT DOCUMENTS

| | | | |
|---|---|---|---|
| 52-58970 | 5/1977 | Japan | 368/256 |
| 53-38369 | 4/1978 | Japan | 368/256 |
| 54-14840 | 2/1979 | Japan | 273/138 A |

OTHER PUBLICATIONS

Datatime Corporation, "*Gametime*", 5/78, Games Magazine.

*Primary Examiner*—Vance Y. Hum
*Assistant Examiner*—Leo P. Picard
*Attorney, Agent, or Firm*—W. G. Fasse; D. H. Kane, Jr.

[57] ABSTRACT

A liquid crystal display in a timepiece apparatus comprises a figure displaying region and a numerical value displaying region. The figure displaying region is utilized for displaying a game pattern in a game mode and the numerical value displaying region is utilized for displaying the current time in a current time display mode. The timepiece apparatus comprises a setting switch for setting a desired alarming time so that an alarm is raised at the set time. An alarm is raised in terms of a sound audibly discernible or in terms of a visible indication visibly discernible. An alarm is raised in a different manner depending on whether an alarm is raised in the timepiece mode or the game mode.

14 Claims, 11 Drawing Figures

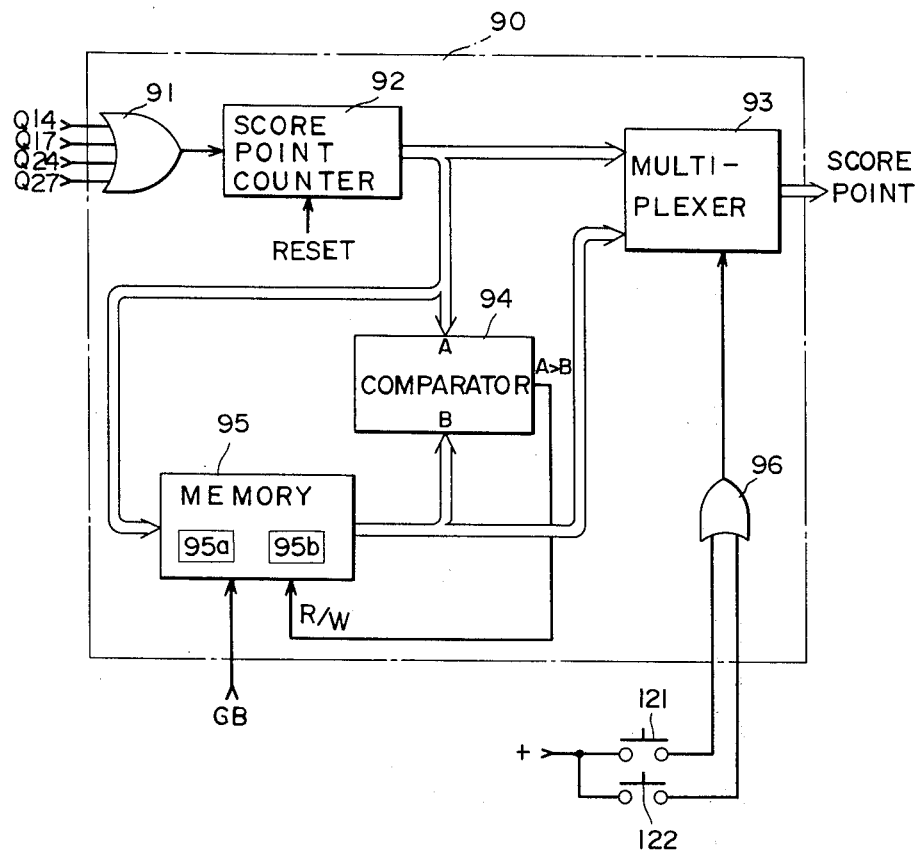

TIMEPIECE APPARATUS HAVING GAME FUNCTION

BACKGROUND OF THE INVENTION

1. Field of the Invention

The present invention relates to a timepiece apparatus having a game function. More specifically, the present invention relates to a novel timepiece apparatus having a game function capable of displaying the current time or displaying a game pattern for playing a game and raising an alarm at a desired alarming time by the use of a display including a digital display portion for a timepiece display and a figure display portion for a game display.

2. Description of the Prior Art

Recently a so-called digital timepiece has been put into practical use that is adapted for displaying the current time in a digital manner. Conventional digital timepieces include a variety of types such as clocks, wristwatches and the like, in which merely the current time information or other information concerning the date or the day of week is displayed. Accordingly, conventional digital timepieces did not have any game pattern or playing a game in addition to displaying the current time. The present inventors previously proposed a timepiece having a game function, which is disclosed in U.S. patent application Ser. No. 161,344. The timepiece apparatus having a game function disclosed in the above referenced patent application is adapted to display the current time or a figure for playing a game by the use of a display comprising a digital display portion and a figure display portion. It is desirable that such timepieces having a game function would cause an alarm at a desired time.

SUMMARY OF THE INVENTION

In summary, the present invention comprises a timepiece having a game function with a display comprising a game information displaying region for displaying a game pattern and a numerical value displaying region for displaying the current time. The present apparatus further comprises alarm means for cause an alarm at a desired time set in advance. The alarm may be raised in a visible and/or audible manner.

The present apparatus can display not only the current time but it can also display a game pattern for playing a game and can further cause an alarm at a desired time set in advance.

In a preferred embodiment of the present invention, the alarm means may comprise visible alarm means for causing an alarm in a visible manner and audible alarm means for sounding an alarm in an audible manner. If and when an alarming time comes when an alarm is to be caused during the timepiece mode of the present apparatus, both the visible alarm means and the audible alarm means are enabled, whereby an alarm is caused both in a visible and audible manner. On the other hand, during the game mode of the inventive apparatus, if and when an alarming time comes when an alarm is to be caused, only the visible alarm means is enabled, whereby an alarm is caused only in a visible manner. Since an alarm is caused only in a visible manner when an alarming time comes during a game, the player need not stop the game in order to stop an alarm in an audible manner and hence he can concentrate his attention on a game.

In another preferred embodiment of the present invention an operation switch for playing a game is adapted to be shared with a time setting operation for setting a desired alarming time. As a result, the number of operation switches can be decreased and the present apparatus can be implemented in simply and inexpensively. In addition, chances of misoperation of the operation switches can be decreased in playing a game as compared with a larger number of operation switches.

In a further preferred embodiment of the present invention, a figure included in the game displaying region is utilized for displaying the lapse of time, such as in terms of second during the timepiece mode. As a result, even during the timepiece mode a figure is automatically driven for display without any manual operation for playing a game, which serves to inform a user of how to play a game.

Accordingly, a principal object of the present invention is to provide a novel timepiece apparatus having a game function which is capable of displaying not only the current time but also of providing pleasure of playing a game and in addition is capable of causing an alarm at a desired time.

One aspect of the present invention resides in a relative simple structure and compact, inexpensive implementation of a novel timepiece apparatus having a game function.

Another aspect of the present invention resides in a player's concentration of his attention on a game without being disturbed by the need for a manual operation for purposes other than the game when an alarming time comes during the game.

Still a further aspect of the present invention resides in notification of an alarming time during either a game or any time other than the game by sounding an alarm in an audible manner during any time other than the game and by causing an alarm in a visible manner during the game, when a preset alarming time comes up.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a schematic diagram of a score point information generating circuit.

DESCRIPTION OF THE PREFERRED EMBODIMENTS AND OF THE BEST MODE OF THE INVENTION

Figure 1:
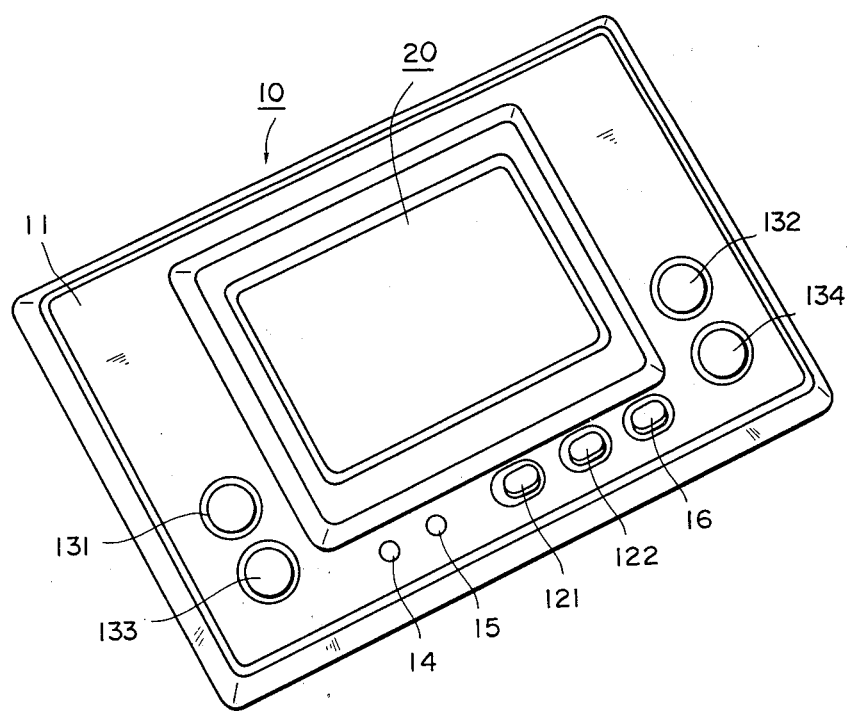
FIG. 1 is a perspective view showing one example of a timepiece apparatus having a game function in accordance with one embodiment of the present invention.

FIG. 1 is a perspective view showing one example of a timepiece apparatus 10 having a game function in accordance with one embodiment of the present invention and comprising a enclosing 11 for housing various circuit components. The size of the timepiece apparatus 10 having a game function actually designed was approximately 95 mm in length, approximately 63 mm in width and approximately 12 mm in thickness. However, the geometry of the apparatus is arbitrary.

The above described housing 11 is provided with a display 20 preferably comprising a liquid crystal display. However, an electrochromic display, an electroluminenscence display and other well-known displays may be utilized to realize the display 20. The display 20 comprises a figure displaying region including a plurality of segments for displaying a figure for playing a game, and a numerical value information display region for digitally displaying the point score in a game, the current time or an alarming time when an alarm is to be caused.

Various operation switches for use in playing a game, and setting the current time are provided in the vicinity of the display 20 of the housing 11. For example, each of the operation switches 121 and 122 acts as a start switch for providing a start command to its respective different game mode. Accordingly, the timepiece apparatus 10 is placed into a game mode when the start switch 121 or 122 is operated. The start switch 121 is used for starting a game A of less difficulty and the start switch 122 is used for a more difficult game B of more difficulty.

Operation switches 131 to 134 are provided at the left and right sides of the display 20 for playing a game. More specifically, the operation switch 131 is used for commanding a display of a fixed symbol segment S31 to be described below with reference to FIG. 2. The operation switch 132 is used for commanding a display of a fixed symbol segment S32. The operation switch 133 is used for commanding a display of a fixed symbol segment S33. The operation switch 134 is used for commanding a display of a fixed symbol segment S34. The operation switches 131 and 132 are used not only for commanding a display of fixed symbols in the game mode but also for correcting the current time or setting the alarming time, as necessary, as will be described more fully below. For example, the operation switch 131 is used for correcting the hour unit of the current time or setting the hour unit of the alarming time, depending on the duration of depressing the switch 131. The operation switch 132 is used for correcting the minute unit of the current time or for setting the minute unit of the alarming time also depending on the duration of depressing the switch 132.

The reset switch 14 is used for resetting the current time on the occasion of the current time setting.

The alarm setting switch 15 is used for setting a desired alarming time when an alarm is to be caused. For example, in setting the alarming time, the alarm setting switch 15 is depressed and then the operation switch 131 is depressed, whereby the hour unit of the alarming time is set, and then the operation switch 132 is depressed to set the minute unit. If the alarm setting switch 15 is not depressed again after the mode for setting the alarming time is selected by the first depression thereof and thereafter the operation switches 131 and 132 are operated, a mode for causing a visible alarm and an audible alarm is selected. If and when the alarm setting switch 15 is depressed again after the alarming time is set (i.e. the same is depressed twice), the mode for maintaining the current time as set and for releasing the generation of an alarm is selected. The purpose of providing two kinds of alarms, i.e. visible alarm and an audible alarm, is to cause both a visible alarm and an audible alarm in the timepiece mode and to cause only a visible alarm in a game mode, thereby eliminating the necessity of resetting an audible alarm by a player during a game so that a player can devote himself to the game. Meanwhile, even if both the visible and audible alarms have been set to be caused, the alarm can be stopped by depressing the current time information calling switch 16 only once, causing a current time display after the current time is set or during the game mode.

Figure 2:
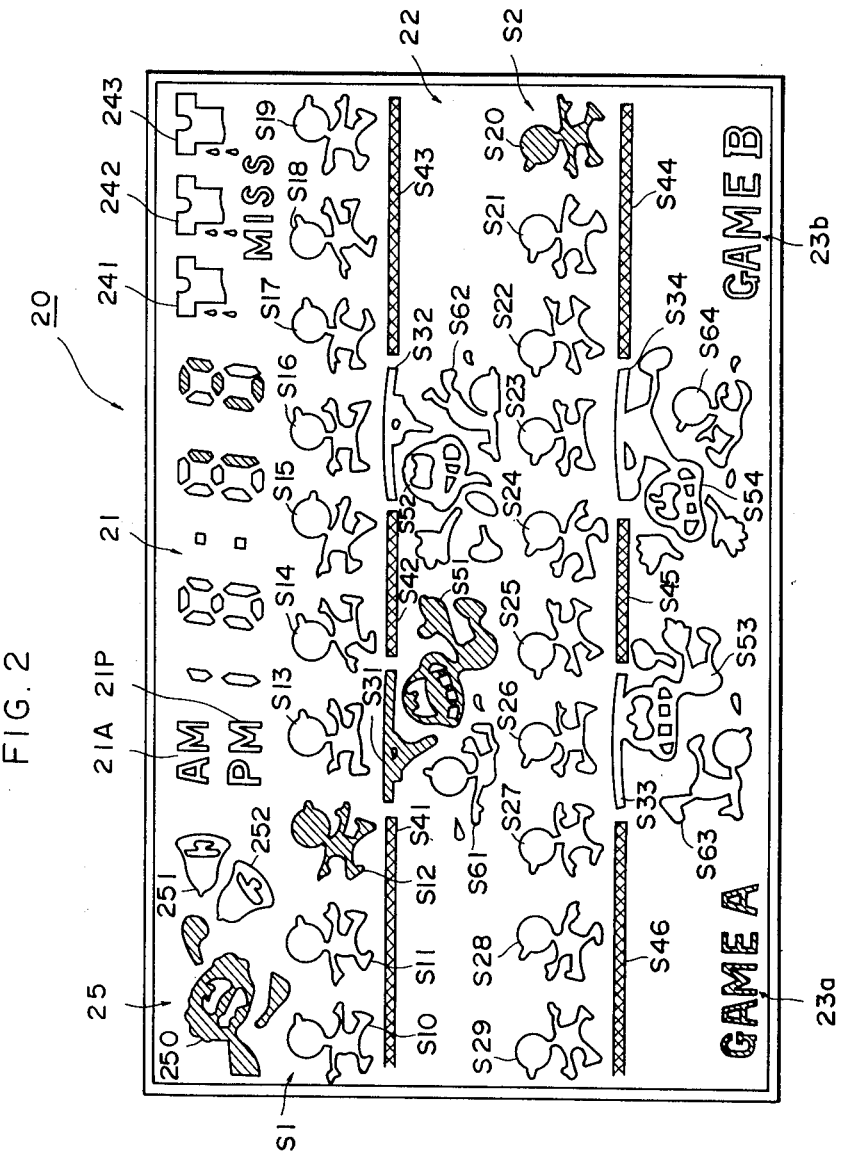
FIG. 2 is a view showing one example of a display pattern being displayed by a display of the FIG. 1 embodiment.

FIG. 2 is a diagrammatic view showing one example of a display pattern being displayed by the display 20 of the embodiment shown. The game being displayed and played by the timepiece apparatus 10 involves a game convention or rule that manholes or holes are provided in a passage or road where a man runs or walks, whereby such holes are selectively shut through selection of the operation switches 131 to 134 when the man is running along the road thereby to prevent the man from falling into the hole, whereby the man is guided from one side to the other side safely. Such game rule or convention may be of any selectable type.

The display 20 of the embodiment shown comprises a numerical value information display portion 21 that can be commonly used for displaying a point score of the game and for displaying the current time information. In displaying the current time with the numerical value information display portion 21, a display portion (the characters AM as shown) 21A for representing before noon and a display portion (the characters PM as shown) 21P for representing afternoon are formed in association with the numerical value information display portion 21 in order to indicate either before noon or after noon. The remaining display region of the display 20 constitutes a figure display region 22 for playing a game.

The figure display region 22 comprises moving symbol displaying regions S1 and S2 for displaying a moving symbol and a fixed symbol displaying region for displaying a game pattern. The moving symbol displaying region S1 comprises a plurality of moving symbol segments S10 to S19 arranged in the lateral direction. The respective moving symbol segments S10 to S19 are each selected to have different shapes in such states that the man is walking or running for the purpose of displaying the man, i.e. the moving symbol, to be seen as apparently moving. Below the respective symbol segments S10 to S12, S14, S15 and S17 to S19, the fixed symbol segments S41, S42 and S43 are formed representing a road or a ground surface where the man can move. Meanwhile, these fixed symbols are adapted to be always displayed and therefore the same may be drawn with paint on the surface of the display 20 in place of the segments being formed. Below the respective moving symbol segments S13 and S16 the fixed symbol segments S31 and S32 are formed so as to be selectively driven for display. These fixed symbol segments S31 and S32 are driven for display in accordance with a manual operation of the above described operation switches 131 and 132. If these switches are not driven for display then a display is made as if a hole exists in the road or the ground surface being shown by the fixed symbols S41, S42 and S43.

The moving symbol displaying region S2 is formed with a lateral directional arrangement of a plurality of moving symbol segments S20 to S29, as in the case of the moving symbol displaying region S1. However, preferably the moving symbol displaying region S2 is formed as shown in FIG. 2 to be in the direction (in the embodiment shown in the leftward direction) opposite to the direction (in the embodiment shown the rightward direction) of the moving direction of the moving symbol segments included in the moving symbol displaying region S1 in order to increase the interest of the game. Below the respective moving symbol segments S20 to S22, S24, S25 and S27 to S29, fixed symbol segments S44, S45 and S46 representing a passage or the ground surface are formed. These fixed symbol segments S44 to S46 may be realized by painting the symbols on the surface of the display 20 where the segments are shown. Below the moving symbol segments S26 and S23 fixed symbol segments S33 and S34 being selectively driven for display are formed. Any one of the respective fixed symbol segments S31 to S34 is selectively displayed through manual operation of the above described operation switches 131 to 134 corresponding thereto.

In order to increase the interest of the game, preferably symbol segments S51 to S54 having a shape of a human for receiving the respective fixed symbol segments S31 to S34 are formed associated with the fixed symbol segments S31 to S34, respectively. The symbol segments S51 to S54 are driven for display simultaneously with the corresponding fixed symbols S31 to S34. Below the respective fixed symbol segments S31, S32, S33 and S34, failure displaying segments S61, S62, S63 and S64 are which are adapted for displaying the falling into a hole or a manhole (i.e. failure in moving a human so that he may not drop) when the player fails in manually operating the operation switches 131, 132, 133 and 134 so as to drive the fixed symbol segments for display at the timing when the moving symbol segments S13, S16, S26 and S23 are driven for display.

Furthermore, below the symbol displaying region 22, game mode displaying portions 23a and 23b are formed for displaying which game mode A or B is being played. Above the symbol displaying region 22, symbol segments 241 to 243 for displaying the number of failures are formed for the purpose of indicating the number of failures out of the allowed number of failures in one game.

Alarm displaying symbol segments 250, 251 and 252 which are an example of alarm displaying means 25 are formed in a portion of the figure displaying region 22 (at the left upper portion in the embodiment shown). The symbol segment 250 is formed as a character having a shape of the human for indicating an alert that an alarming time is approaching, for example. The symbol segments 251, 252 are selected to represent, for example, the figure of a bell in order to display a state of tolling a bell serving as a visible alarm when a preset alarming time has come up. In the case where an alarming time has been set, the symbol segment 250 is driven for display. When an alarming time is reached, the symbol segment 251 or 252 having the figure of a bell is alternately driven for display, whereby a display is made as if a bell is apparently ringing. By way of another example of the alarm display means only one display (such as a symbol segment 251) may be displayed in a blinking manner at given intervals.

Although the embodiments shown are of a case in which moving symbol segments formed in the moving symbol displaying regions S1 and S2 are of a shape of a human as a lateral directional arrangement of a plurality of segments, it is clear that any type of shapes and moving directions may be selected.

The above described display 20 formed with the respective symbol segments is implemented by a liquid crystal display, for example. More specifically, one electrode or segment electrodes of the liquid crystal display is formed in the shapes of the respective segments as shown. The other electrode, i.e. a common electrode of the liquid crystal display is common to the entire surface of the liquid crystal display. In controlling a display, a figure or symbol is selectively displayed depending on the kind of the symbol segments in which an electric field is applied between the common electrode and the segment electrode.

Figure 3:
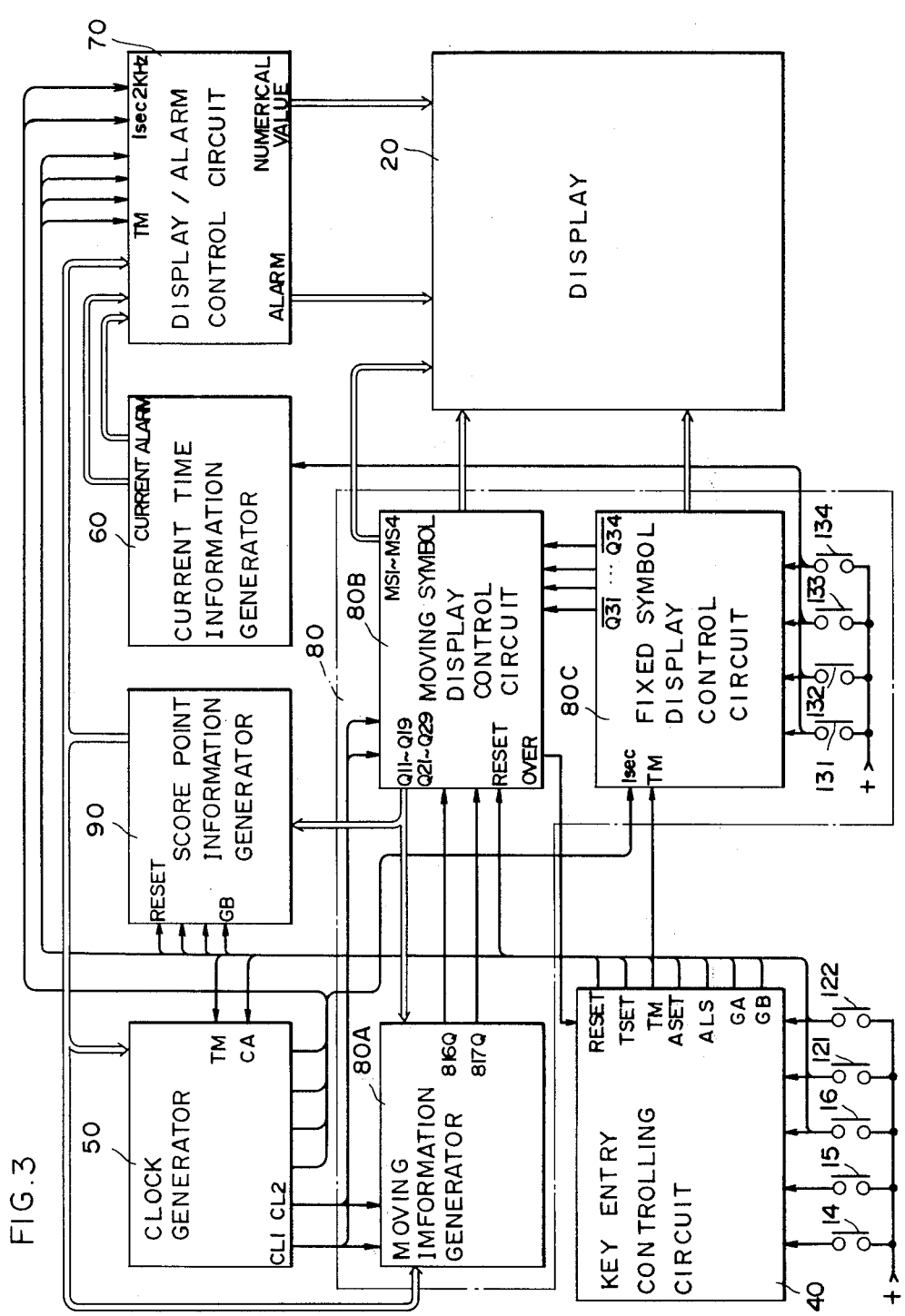
FIG. 3 is a block diagram showing the above described embodiment of the present invention.

FIG. 3 is a block diagram showing an outline of the timepiece apparatus having a game function in accordance with one embodiment of the present invention. The timepiece apparatus 10 having a game function of the embodiment shown comprises the display 20, the key entry control circuit 40, the clock signal generating circuit 50, the time information generating circuit 60, the display/alarm control circuit 70, the game associated information generating circuit 80 and the score point information generating circuit 90.

A specific structure of the FIG. 3 embodiment will now be described. The key entry control circuit 40 is connected to various switches 121, 122 and 14 to 16 provided on the housing 11 shown in FIG. 1. The key entry control circuit 40 provides a signal for commanding initial resetting (hereinafter referred to as a signel RESET) when the start switch 121 or 122 is depressed. The key entry control circuit 40 also provides a signal TSET representing that the current time correction mode is selected when the reset switch 14 is depressed. The key entry control circuit 40 also provides a signal TM representing that the timepiece mode is selected when the current time information calling switch 16 is depressed. The key entry control circuit 40 further provides a signal ASET representing the set mode of the alarming time and the set state of the alarming time responsive to the first time depression of the alarm setting switch 15. Circuit 40 also provides a signal ALS representing that generation of the audible alarm is released and only the alarming display is made in response to the second time depression of the alarm setting switch 15. The key entry control circuit 40 will be described in detail below with reference to FIG. 4.

The clock signal generating circuit 50 comprises a quartz oscillator, as specifically shown in FIG. 5 described below. The clock signal generating circuit 50 is adapted to generate a pulse of 2 kHz serving as an audio signal source for generating an alarm as a sound, a clock signal of 0.25 seconds (250 milliseconds) for use as a quick advancing clock signal in correcting the current time, a second clock signal, and a minute clock signal. The clock signal generating circuit 50 is also adapted to generate clock pulses clocks, referred to as CL1 and CL2 for changing the apparent moving speed of the above described moving symbol segments in the game mode based on the score point information given by the score point information generating circuit 90 to be described below. The clock CL1 is used for displaying an apparent movement of the respective moving symbol segments S10 to S19 of the moving symbol displaying region S1. The clock CL2 is used for displaying an apparent movement of the respective moving symbol segments S20 to S29 of the moving symbol displaying region S2. The clocks CL1 and CL2 are selected such that both are of the same period or frequency but have a phase difference of a half a period.

Figure 6:
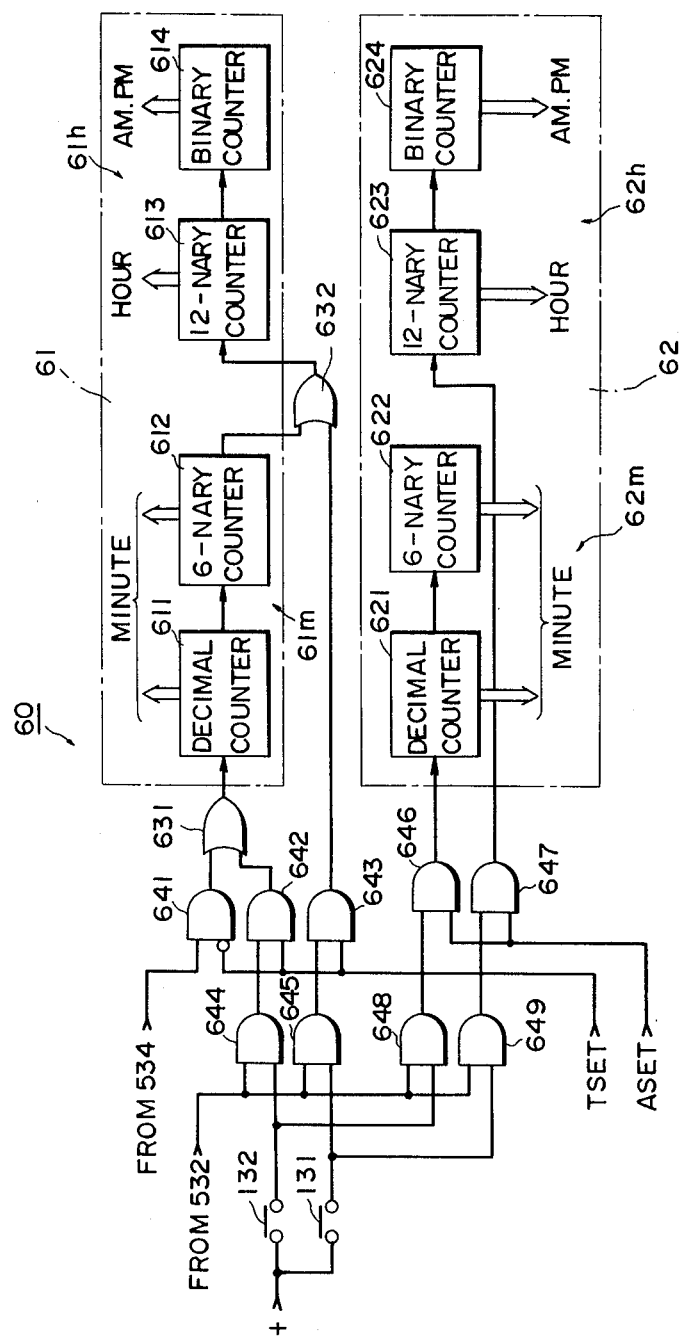
FIG. 6 is a schematic diagram of a time information generating circuit.

The time information generating circuit 60 comprises a current time information generating circuit and an alarming time storing circuit, as shown in FIG. 6 to be described below.

Figure 7:
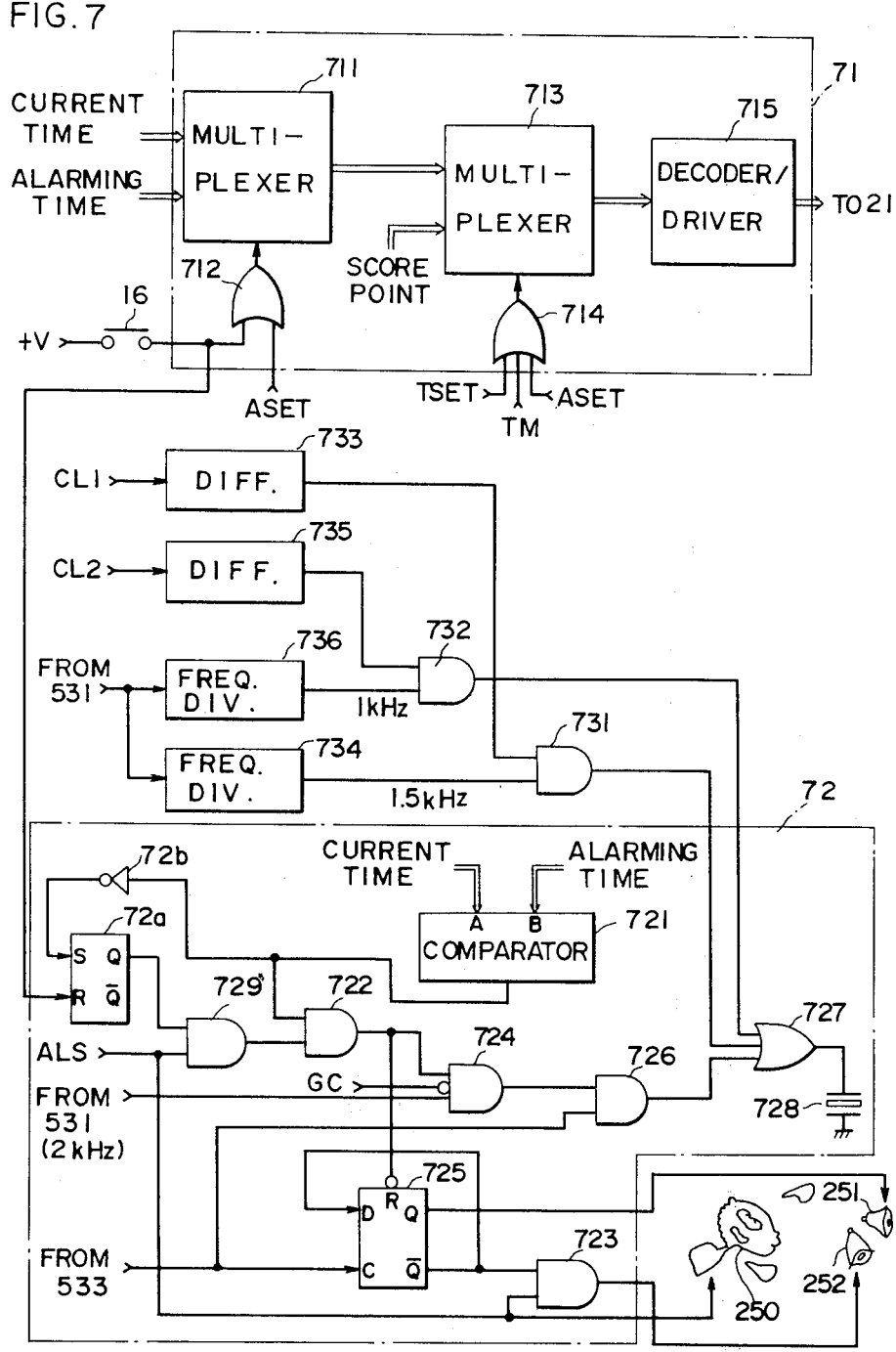
FIG. 7 is a schematic diagram of a numerical value/alarm controlling circuit.

The display/alarm control circuit 70 is adapted to display in the above described numerical value information display portion 21 the current time applied from the above described time information generating circuit 60 in the timepiece mode and the point score information applied from a score point information generating circuit 90 to be described below in the game mode. The display/alarm control circuit 70 is further adapted to drive for display the above described alarm symbol segments 251 and 252 when the alarming time which is stored in advance in the time information generating circuit 60, up. The detail of the display/alarm control circuit 70 is depicted in FIG. 7 to be described below.

Figure 8A:
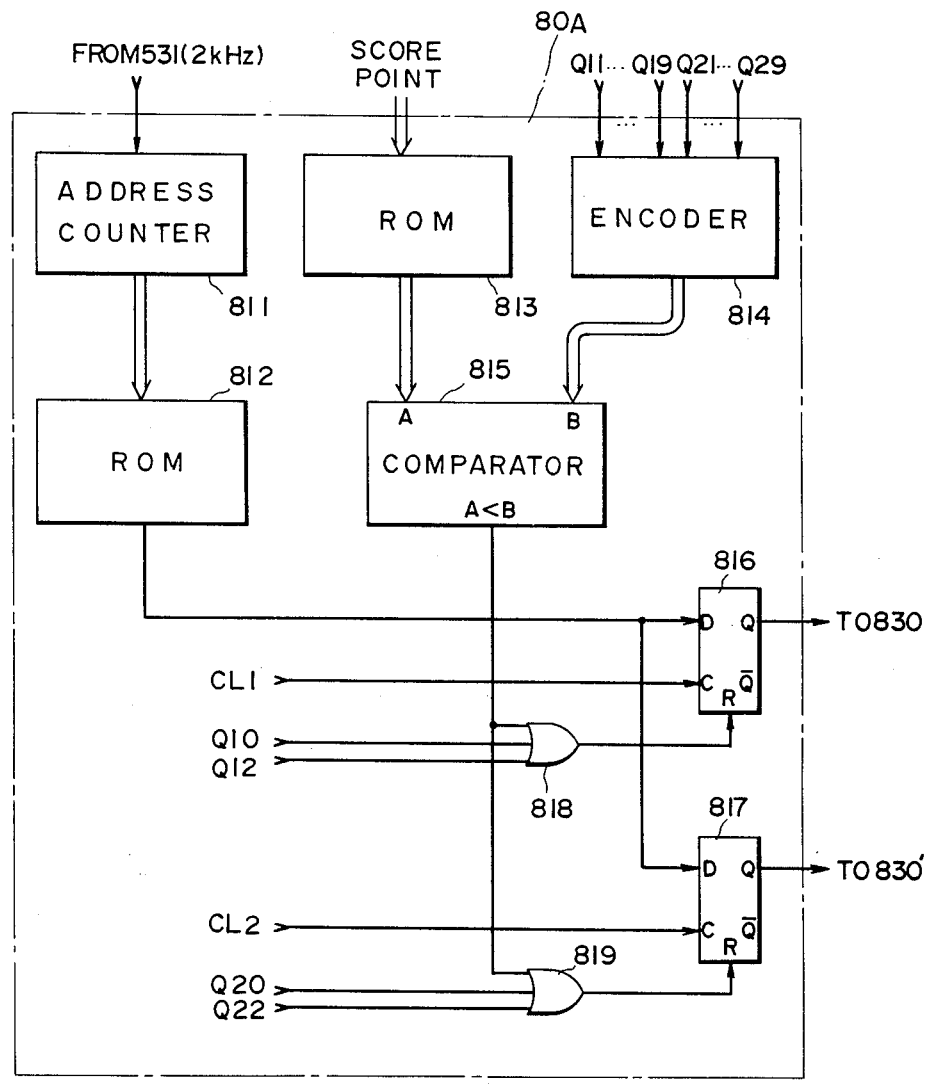
FIGS. 8A, 8B and 8C are schematic diagrams of a game associated information generating circuit.
Figure 8B:
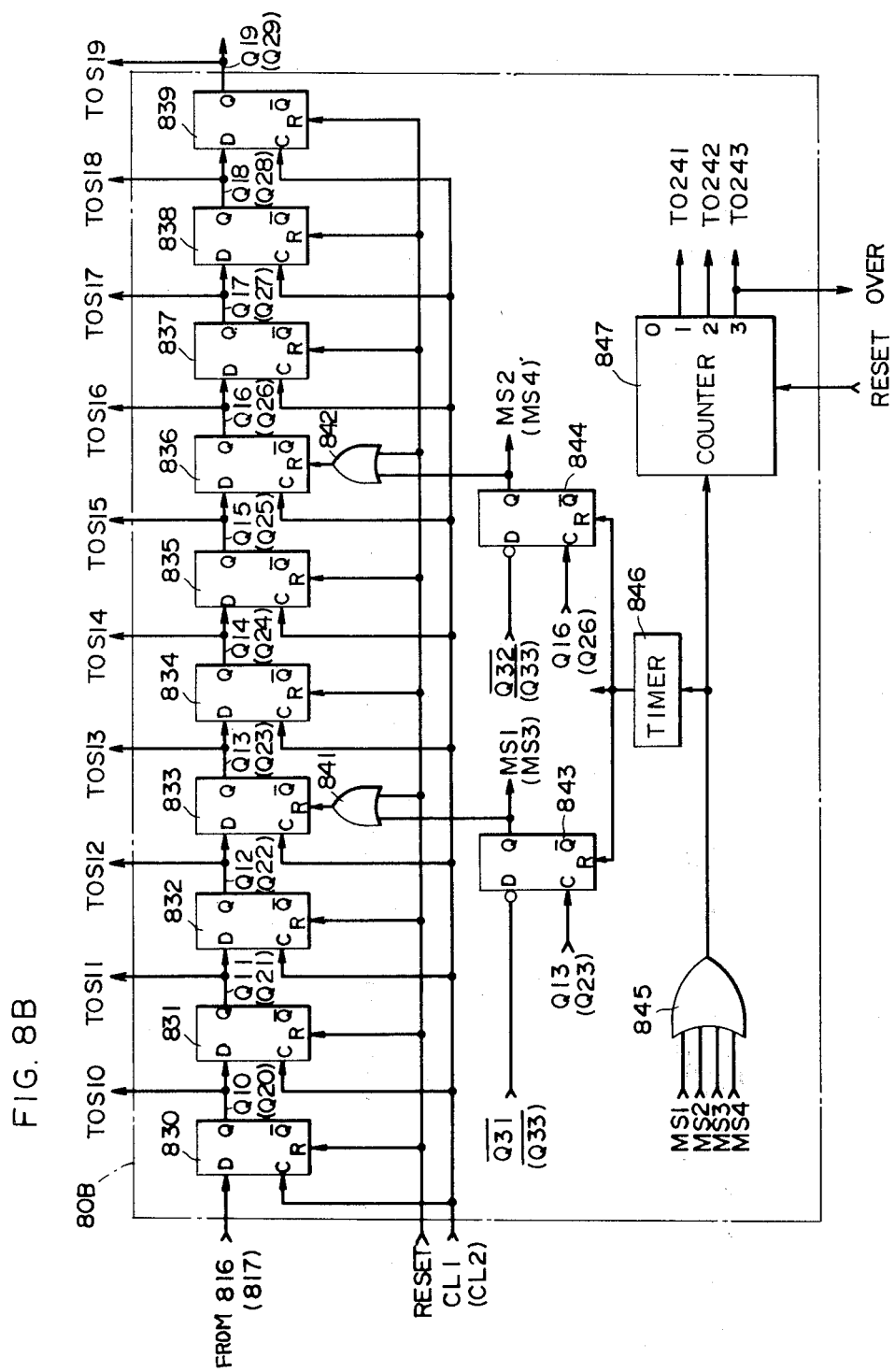
Figure 8C:
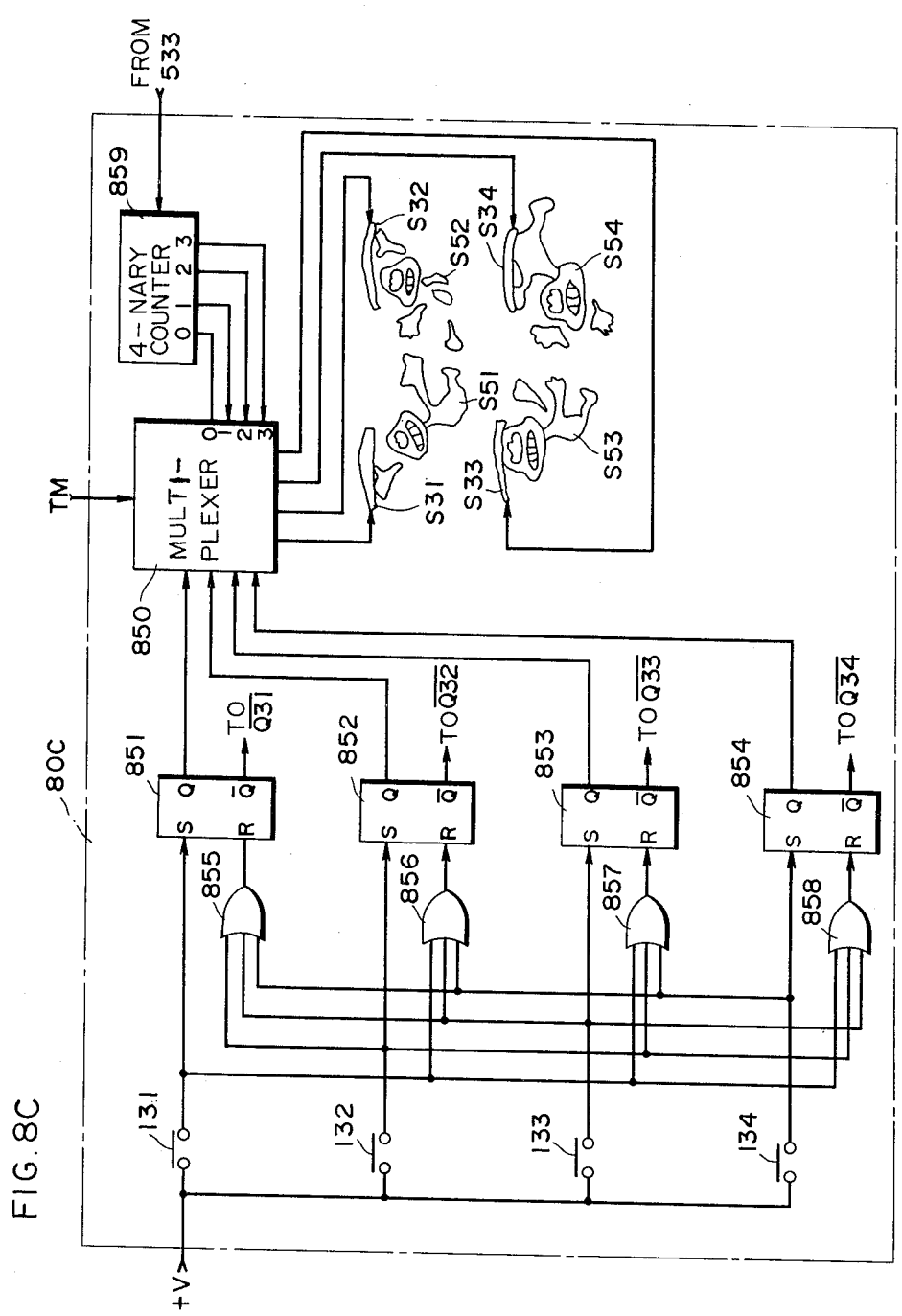

The game associated information generating circuit 80 comprises a moving information generating circuit 80A, a moving symbol display control circuit 80B and a fixed symbol display control circuit 80C. The details of the game associated information generating circuit 80 are shown in FIGS. 8A to 8C to be described below.

The score point information generating circuit 90 is adapted to count the point score based on the status of a game in the game mode. As necessary, the point score information generating circuit 90 performs the function of storing the best score so far attained in one game. The point score information counted by the point score information generating circuit 90 is applied to the clock signal generating circuit 50, the display/alarm control circuit 70 and the moving information generating circuit 80A included in the game associated information generating circuit 80.

Referring to FIGS. 4 to 9, the detailed structure and the operations of the above described circuits will be described in the following.

Figure 4:
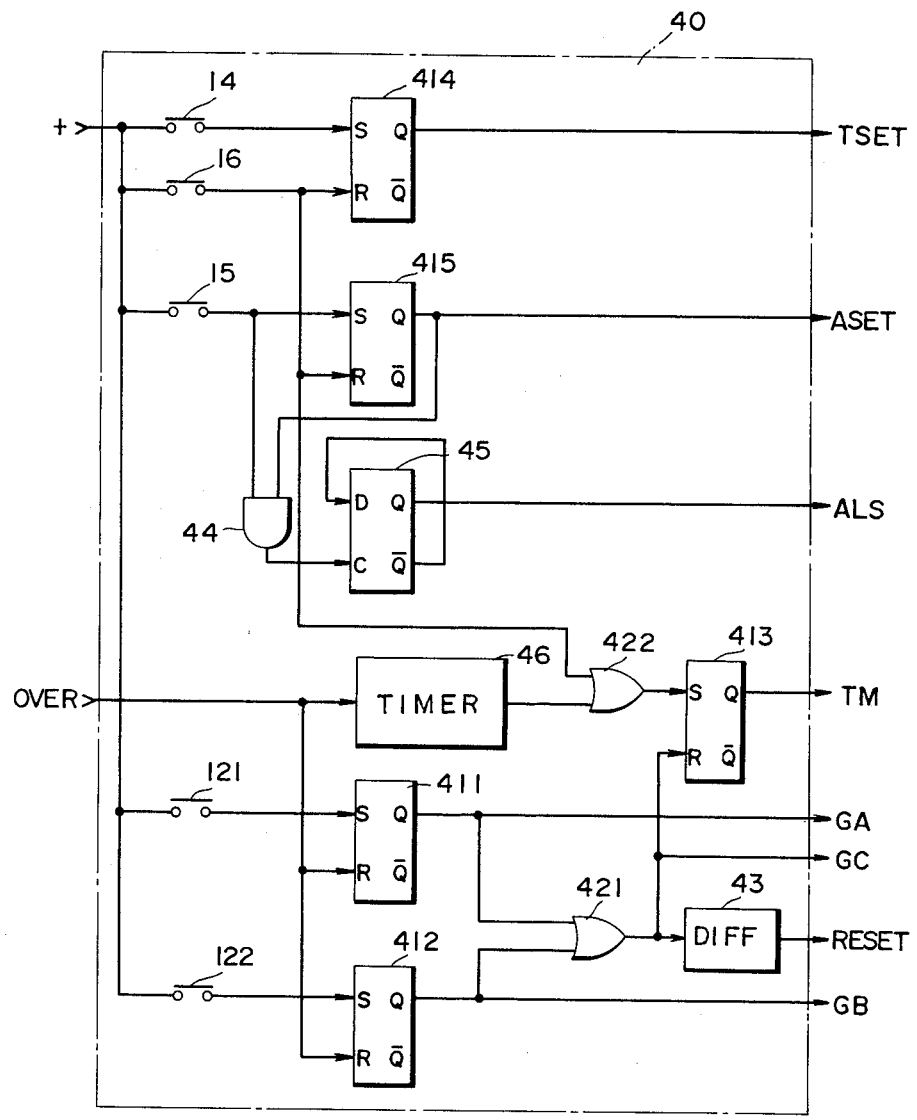
FIG. 4 is a schematic diagram of a key entry control circuit.

FIG. 4 is a schematic diagram of the key entry control circuit 40. The high level output signal obtained when the start switch 121 is depressed for game A, is applied for flip-flop 411 as a set input. The output signal responsive to depression of the start switch 122 of the game B is applied to the flip-flop 412 as a set input. The set output of the flip-flop 411 is applied to the OR gate 421 as one input and is also withdrawn as a signal GA for selecting the game A mode. The set output of the flip-flop 412 is applied to the OR gate 421 as the other input and is also withdrawn as the signal GB for selecting the game B mode. The signal GB or GA is applied as the addressing data of the best point score storing memory of the score point information generating circuit shown in FIG. 9. The output of the OR gate 421 is applied to the flip-flop 413 as a reset input and is also applied to the differentiating circuit 43 and is further withdrawn as a signal GC representing that the game is going on. The differentiating circuit 43 differentiates the rise of the high level signal being applied from the OR gate 421 and provides the differentiated pulse as a signal RESET. A game is initiated responsive to the signal RESET.

The output signal caused by depression of the reset switch 14 is applied to the flip-flop 414 as a set input. The output signal responsive to depression of the time information calling switch 15 is applied to the flip-flop 415 as a set input and is also applied to the AND gate 44 as one input thereto. The set output of the flip-flop 414 (i.e. the signal TEST representing the time correcting mode) and the set output of the flip-flop 415 (i.e. the signal ASET representing the alarming time setting mode) are applied to the time information generating circuit 60 and the display/alarm control circuit 70. The signal ASET is applied to the AND gate 44 as the other input. The output of the AND gate 44 is applied to the clock input terminal (C) of the D-type flip-flop 45. The reset output ($\overline{Q}$) of the D-type flip-flop 45 is applied to the data input terminal (D). The D-type flip-flop 45 functions such that when the input pulse is applied to the clock input terminal (C) the data (i.e. the high level or the low level) being applied to the data input terminal (D) is provided as the set output. The set output of the D-type flip-flop 45 is withdrawn as the signal ALS representing the mode in which an alarm is caused in an audible and visible manner and the same is applied to the display/alarm control circuit 70.

After correction of the current time and setting of the alarming time, the time information calling switch 16 is depressed. The output signal caused by depression of the time information calling switch 16 is applied to the flip-flops 414 and 415 as a reset input and is also applied to the OR gate 422 as one input thereto. The signal OVER, representing the end of the game being obtained from the moving symbol display control circuit 80B at the end of one game, is applied to the timer 46 as an operation enabling signal and is also applied to the flip-flops 411 and 412 as a reset input. The timer 46 provides the high level output commanding selection of the timepiece mode after the lapse of a predetermined time period after the signal OVER is obtained and the high level output is applied to the OR gate 422 as the other input. The output of the OR gate 422 is applied as a set input to the flip-flop 413. The set output of the flip-flop 413 becomes the signal TM for selecting the timepiece mode and is applied to the clock signal generating circuit 50, the display/alarm control circuit 70 and the fixed symbol display control circuit 80C.

Figure 5:
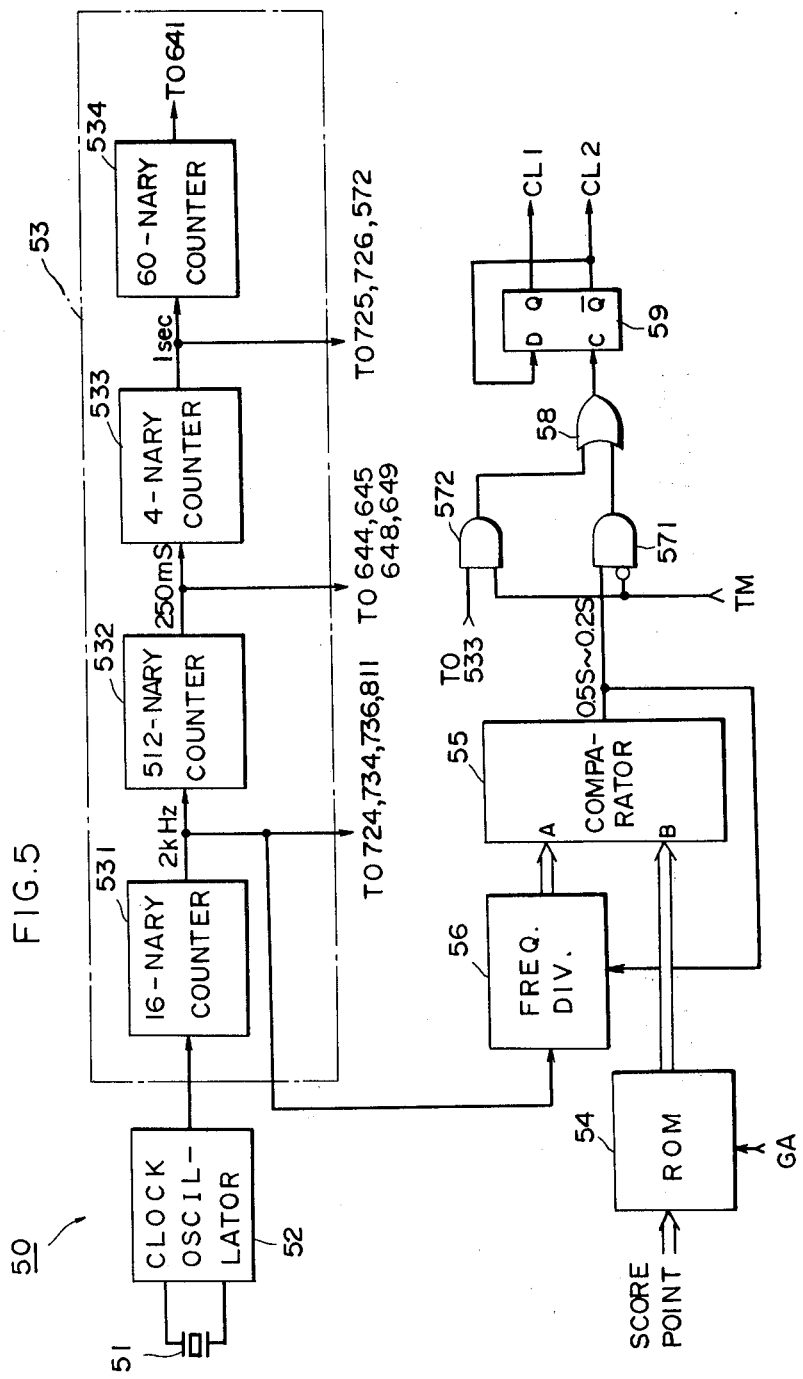
FIG. 5 is a schematic diagram of a clock signal generating circuit.

FIG. 5 is a schematic diagram of the clock signal generating circuit 50 comprising a quartz vibrator 51 and a clock oscillator 52. The clock oscillator 52 generates a reference clock of an inherent vibration frequency (say 32.768 kHz) of the quartz vibrator 51 and the reference clock is applied to the frequency dividing circuit 53. The frequency dividing circuit 53 is responsive to the reference clock to provide a clock pulse of the frequency necessary for various controls. For example, the frequency dividing circuit 53 comprises a 16-nary counter 531, a 512-nary counter 532, a 4-nary counter 533 and a 60-nary counter 534. The 16-nary counter 531 frequency divides the reference clock to the pulse of the frequency of approximately 2 kHz and the output pulse thereof is applied to the 512-nary counter 532 and the frequency dividing counter 56. The output pulse of the 16-nary counter 531 is also applied to the AND gate 724 included in the display/alarm control circuit 70 as a sound source signal for causing an audible alarm. The 512nary counter 532 frequency divides the input pulse by 1/512, thereby providing a pulse of 250 milliseconds, which is applied to the 4-nary counter 533 and is also applied to the time information generating circuit 60 as a quick advancing clock. The 4-nary counter 533 frequency divides the input pulse by ¼, thereby providing a one second clock pulse, which is applied to the 60-nary counter 534 and the time information generating circuit 60 and the fixed symbol control circuit 80C. The 60-nary counter 534 frequency divides the input pulse by 1/60, thereby providing a one minute clock pulse. The minute clock pulse is applied to the time information generating circuit 60.

The read only memory 54 stores in advance the data for changing the driving speed of the sequential display of the above described moving symbol segments S10 to S19 and S20 to S29, i.e. the moving speed of the moving symbol, separately for the point score and separately for each mode of the game (A or B). For example, the read only memory 54 has storing regions of a plurality of addresses, which are divided into regions of high order addresses and regions of low order addresses. Division of the storing regions into the regions of high order addresses and the regions of low order addresses is made such that one of them is identified with the address information of the logic one at the most significant bit of the address information while the other is identified with the address information other than said logic one. The regions of high order addresses are stored with the numerical value of a relatively large value at the address corresponding to each point score information for the purpose of relatively slowing down the moving speed of the moving symbol in the game A. On the other hand, the regions of low order addresses are stored with the numerical value of a relatively small value at the respective addresses corresponding to each point score information in order to relatively increase the moving speed of the moving symbol in the game B. The read only memory 54 is responsive to the presence or absence of the signal GA and the point score information to provide the numerical value information associated with the speed with which the moving symbol is to be moved, which is applied to one input of the comparator 55 as a signal for controlling the frequency division ratio. The other input of the comparator 55 is supplied with the count value of the frequency dividing counter 56. The comparator 55 always compares the numerical value obtained from the read only memory 54 and the count value in the frequency dividing counter 56 and provides a high level output upon coincidence of both inputs, which is applied as one input to the AND gate 571 and is also applied to the frequency dividing counter 56 as a reset singal. Since the period of advancement of the count value in the frequency dividing counter 56 is constant, the period of the high level output from the comparator 55 is determined by the magnitude of the numerical value obtained from the read only memory 54. For example, the numerical value being set in the read only memory 54 is selected such that the period of the high level output obtained from the comparator 55 may be 0.2 to 0.5 seconds in consideration of the interest of the game and a response rate of a player in playing a game.

The AND gate 571 provides an output pulse from the comparator 55 in the absence of the signal TM (i.e. on the occasion of the game mode), which is applied as an input to the OR gate 58. The other input of the OR gate 58 is supplied with the output pulse from the AND gate 572. The AND gate 572 provides a one second clock pulse in the presence of the signal TM (i.e. on the occasion of the timepiece mode). The purpose of enabling either the AND gate 571 or 572 depending on the timepiece mode or the game mode is to change the moving speed of the moving symbol based on the point score information in the game mode and to display the change of the unit time by the use of the moving symbol being used in the game per each unit time (say one second) during the timepiece mode. The output of the OR gate 58 is applied to the D-type flip-flop 59 as a clock input. The reset output ($\overline{Q}$) of the flip-flop 59 is applied to the data input terminal (D) and is also applied to the moving symbol display control circuit 80B as the clock CL2 for sequential movement of the moving symbol in the moving symbol display region S2. The set output (Q) of the flip-flop 59 is withdrawn as the clock CL1 and is applied to the moving symbol display control circuit 80B as a clock for enabling sequential movement of the restrictive moving symbol in the moving symbol display region S1. The purpose of withdrawing the set output and the reset output of the D-type flip-flop 59 as the clock CL1 and CL2 is to provide both clocks CL1 and CL2 of different phases and of the same period.

FIG. 6 is a schematic diagram of the time information generating circuit 60 which comprises the current time information generating circuit 61 for generating the current time information by measuring the time and the alarming time storing circuit 62 for storing the time when an alarm is to be caused.

The above described current time information generating circuit 61 comprises a minute counter $61m$ for measuring the minute information and an hour counter $61h$ for measuring the hour information. The minute counter $61m$ comprises a decimal counter 611 and a 6-nary counter 612. The decimal counter 611 provides one pulse each time it counts ten clocks received from the OR gate 631. This output pulse is applied to the 6-nary counter 612, whereby the counted value is applied to the display/alarm control circuit 70 as the minute information at the ones digit. The 6-nary counter 612 provides one pulse each time six input pulses are counted and the output pulse is applied as one input to the OR gate 632, whereby the counted value is applied to the display/alarm control circuit 70 as the minute information at tens digit.

The hour counter $61h$ comprises the 12-nary counter 613 and the binary counter 614. The hour counter 613 provides one pulse to the binary counter 614 each time twelve pulses from the OR gate 632 are counted, whereby the counted value is applied to the display/alarm control circuit 70 as the hour information. The binary counter 614 provides a signal indicating whether the time is before noon or after noon based on the count value. The signal representing before noon or after noon obtained from the binary counter 614 is applied to the display/alarm control circuit 70.

The operation for measuring the current time by the above described current time information generating circuit 61 is performed in the manner set forth in the following. More specifically, in the modes other than the time correction mode (i.e. in the modes when the signal TSET is not obtained) the AND gate 641 is enabled and the AND gates 642 and 643 are disabled. Therefore, the AND gate 641 provides the one minute clock to the decimal counter 611 through the OR gate 631 each time the one minute clock is obtained. As a result, each time the one minute pulse is obtained the current time information generating circuit 61 advances the minute unit information of the current time and advances the hour unit information for every sixty minutes, whereby the current time is measured.

The correction of the current time is made in the manner set forth in the following. More specifically, in the time correction mode the reset switch 14 is depressed. Accordingly, the signal TSET is obtained from the above described flip-flop 414 and the AND gates 642 and 643 are enabled and the AND gate 641 is disabled. The AND gates 644 and 645 are normally supplied with the quick advancing clock (a clock of 0.25 seconds). Accordingly, in the case of correction of the current time in terms of the minute unit, the quick advancing clock is obtained from the AND gate 644 during the depression of the operation switch 132. The quick advancing clock is applied through the AND gate 642 and the OR gate 631 to the decimal counter 611. Accordingly, the minute counter 61m counts the quick advancing clock, thereby advancing the minute unit information. When a desired minute unit is reached, the previously depressed operation switch 132 is released, whereby correction of the current time in terms of the minute unit is terminated.

On the other hand, correction of the current time in terms of the hour unit is made by depression of the operation switch 131. In this case, the quick advancing clock is applied through the AND gates 645 and 643 and the OR gate 632 to the 12-nary counter 613 during the depression of the operation switch 131. As the result, the hour counter 61h advances of the hour unit information each time the quick advancing clock is obtained.

The above described alarming time storing circuit 62 is composed of the minute counter 62m for counting and storing the minute unit of the alarming time and the hour counter 62h for counting and storing the hour unit of the alarming time. The minute counter 62m comprises the decimal counter 621 and 6-nary counter 622. The decimal counter 621 counts the input pulse from the AND gate 646, thereby providing an one pulse each time ten pulses are counted. The 6-nary counter 622 counts the output of the decimal counter 621. The count values in the decimal counter 621 and the 6-nary counter 622 are applied to the display/alarm control circuit 70 as the minute unit information of the alarming time. The hour counter 62h comprises the 12-nary counter 623 and the binary counter 624. The 12-nary counter 623 counts the input pulse from the AND gate 647, thereby providing an output pulse each time twelve pulses are counted. The binary counter 624 counts the output pulses from the 12-nary counter 623. The count value in the 12-nary counter 623 is withdrawn as the hour unit information of the alarming time and the output in the binary counter 624 is withdrawn as the signal for identifying before noon or afternoon. The output of both counters 623 and 624 is applied to the display/alarm control circuit 70. The operation for setting the desired alarming time in the alarming time storing circuit 62 is performed by operation of the operation switches 131 and 132 when the signal ASET is applied to the AND gates 646 and 647. Details thereof will be described below.

Although the figure shows a case where the alarming time storing circuit 62 is implemented as a counter, for example, the same may be implemented by storing means such as registers, in place thereof.

FIG. 7 is a schematic diagram of the display/alarm control circuit 70 which comprises a numerical value information display control circuit 71 and an alarm control circuit 72. The numerical value information display control circuit 71 comprises multiplexers 711 and 713, OR gates 712 and 714, and a decoder/driver 715. The multiplexer 711 is supplied with the current time information and the alarming time information from the time information generating circuit 60. The multiplexer 711 selects the alarming time information to provide the same to the multiplexer 713 when the multiplexer 711 is supplied with the high level output from the OR gate 712 and selects the current time information to provide the same to the multiplexer 713 when the multiplexer 711 is supplied with the low level output from the OR gate 712. The OR gate 712 provides the high level output during the depression period of the above described time information calling switch 16 or the period when the above described signal ASET is obtained. The multiplexer 713 is supplied with the output information of the multiplexer 711 or the point score information from the point score information generating circuit 90. The multiplexer 713 provides the input information from the multiplexer 711 when the output from the OR gate 714 is the high level and provides the point score information when the output of the OR gate 714 is the low level and the output therefrom is applied to the decoder/driver 715. The OR gate 714 provides the high level output during a time period when any one of the signal TSET representing the time correction mode, the signal TM representing the timepiece mode, or the signal ASET representing the alarming time setting mode are obtained. The decoder/driver 715 is responsive to any one of the numerical value being applied from the multiplexer 713, i.e. the current time information or the alarming time information, and the score point information, to cause the numerical value information display portion 21 to display the same.

The alarm control circuit 72 constituting one feature of the present invention will now be described. The alarm control circuit 70 comprises a function for causing an alarm in a visible manner and a function for sounding an alarm in an audible manner when the alarming time comes up. More specifically, the comparator 721 is supplied with the current time information and the alarming time information and when both inputs become equal to each other the comparator 721 provides the high level output, which is applied as one input to the AND gate 722. The other input of the AND gate 722 is supplied with the output of the AND gate 729. The AND gate 729 is supplied with the set output of the flip-flop 72a and the signal ALS. The flip-flop 72a is set responsive to the non-coincidence output of the low level from the comparator 721 being applied through the inverter 72b and is reset responsive to depression of the time information calling switch 16. As a result, the AND gate 722 provides the signal for commanding generation of an alarm in an audible manner during a time period after the current time becomes the alarming time until the time information calling switch 16 is depressed in the case where the signal ALS is available. The output of the AND gate 722 is applied as one input to the AND gate 724 and is also applied to the D-type flip-flop 725. The AND gate 724 provides the output signal (2 kHz) of the 16-nary counter 531 when the game signal GC is not available and the output of the AND gate 722 is available; this output signal is applied to the AND gate 726. The AND gate 726 provides an intermittent pulse at a one second clock period for sounding an alarm in an audible manner when the output of the AND gate 724 is available and the said output is applied through the OR gate 727 to the piezoelectric vibrator 728 as a sound source signal.

The above described second clock is applied to the clock input terminal of the flip-flop 725. The flip-flop 725 is enabled in response to the output of the AND gate 722 and the high level output is obtained alternately at a period of one second clock from the set output terminal and the reset output terminal. The set output (Q) of the flip-flop 725 is applied to drive the symbol segment 251 for display. The reset output (Q) of the flip-flop 725 is applied as one input to the AND gate 723. The other input of the AND gate 723 is supplied with the signal ALS. The AND gate 723 provides a one second interval signal when the signal ALS is available and the current time becomes the alarming time, thereby driving the symbol segment 252 for display. Furthermore, in the mode for sounding an alarm in an audible manner, the signal ALS drives the symbol segment 250 for display.

The embodiment may be structured in the following manner for the purpose of audibly indicating, as necessary, the moving state of the moving symbol being apparently moved in the moving symbol display regions S1 and S2 during the game. More specifically, the outputs of the AND gates 731 and 732 are applied to the OR gate 727. The AND gate 731 is supplied with the output from the differentiating circuit 733 and the frequency divider 734. The AND gate 732 is supplied with the output from the differentiating circuit 735 and the frequency divider 736. The differentiating circuit 733 differentiates the clock CL1 and the differentiating circuit 735 differentiates the clock CL2. The frequency dividers 734 and 736 receive the signal of the same frequency (say 2 kHz), thereby to frequency divide the same at different frequency division ratios. The purpose of differentiating the frequency division ratios for each of the moving symbol display regions is to change the tone color each time the moving symbol segment apparently moves in the respective moving symbol display regions.

FIGS. 8A to 8C are schematic diagrams of the game associated information generating circuit 80, wherein FIG. 8A shows the detail of the moving information generating circuit 80A, FIG. 8B shows the detail of the moving symbol display control circuit 80B and FIG. 8C shows the detail of the fixed symbol display control circuit 80C.

First, referring to FIG. 8A, the details of the moving information generating circuit 80A will be described. The output clock from the above described 16-nary counter 531 is 811 which in response to the clock advances the count value, thereby providing the count value to the random data generating read only memory 812 as the addressing information. The read only memory 812 comprises a plurality of addresses of storing regions, whereby the logic zero and the logic one are stored in appropriate addresses. The information, i.e. the logic one in a specified address, serves as a signal for driving the moving symbol segment S10 or S20 representing the start point for display in the above described moving symbol display regions S1 and S2. The said signal is applied to the data input terminals (D) of the D-type flip-flops 816 and 817.

The point score information is applied from the above described point score information generating circuit 90 to the read only memory 813 as the addressing information. The read only memory 813 comprises a plurality of addresses corresponding to the point score information and stores the number of moving symbols being displayed as apparently moving in the moving symbol display regions S1 and S2 at the respective addresses. The number of the moving symbols being displayed are shown in the table below. More specifically, the number of moving symbols being displayed for each point score is represented by the value in the table at the intersection of the columns and the rows corresponding to the point score in the case where the columns of the table are assumed to be the point score information of the hundreds order and the rows of the table are assumed to be the point score information of the ones digit order and the tens digit order. In the embodiment shown at 20, the maximum number of moving symbols being displayed is selected to be smaller than half of the maximum value that can be displayed in the moving symbol display regions S1 and S2 so that a player can operate.

TABLE

| 10 order | 100 order | | | | | | | | |
|---|---|---|---|---|---|---|---|---|---|
| | 0 | 100 | 200 | 300 | 400 | 500 | 600 | 700 | 800 | 900 |
| 0~9 | 0 | 1 | 1 | 2 | 2 | 2 | 2 | 3 | 3 | 3 |
| 10~19 | 1 | 1 | 2 | 2 | 2 | 2 | 3 | 3 | 3 | 4 |
| 20~29 | 1 | 2 | 2 | 2 | 2 | 3 | 3 | 3 | 4 | 4 |
| 30~39 | 2 | 2 | 2 | 2 | 3 | 3 | 3 | 4 | 4 | 4 |
| 40~49 | 2 | 2 | 2 | 3 | 3 | 3 | 4 | 4 | 4 | 5 |
| 50~59 | 2 | 2 | 3 | 3 | 3 | 4 | 4 | 4 | 5 | 5 |
| 60~69 | 2 | 3 | 3 | 3 | 4 | 4 | 4 | 5 | 5 | 6 |
| 70~79 | 3 | 3 | 3 | 4 | 4 | 4 | 5 | 5 | 6 | 7 |
| 80~89 | 3 | 3 | 4 | 4 | 4 | 5 | 5 | 6 | 7 | 8 |
| 90~ | 3 | 4 | 4 | 4 | 5 | 5 | 6 | 7 | 8 | 9 |

The data representing the number of moving symbols being displayed as read from the above described read only memory 813 is applied to the comparator 815. The comparator 815 is also supplied with the output from the encoder 814. The encoder 814 is supplied, in parallel with the signals for commanding the display of the respective moving symbol segments S10 to S19 and S20 to S29 included in the moving symbol display regions S1 and S2 (i.e. the set outputs Q11 to Q19 and Q21 to Q29 of the D-type flip-flops 830 to 839 shown in FIG. 8B to be described subsequently). The encoder 814 is responsive to such inputs to encode the same, thereby providing the information of the number of the moving symbols being presently displayed in the moving symbol display regions S1 and S2 to the comparator 815. The comparator 815 provides the high level output when the number of the moving symbols being presently displayed becomes larger than the data of the number to be commanded for display (i.e. in the case of A>B), thereby providing the same to the OR gates 818 and 819. The output of the OR gate 818 forcibly resets the flip-flop 816. The output of the OR gate 819 forcibly resets the flip-flop 817. Thus, when the data of the number of moving symbols being presently displayed becomes larger than the information of the number to be commanded for display, the command for display of the moving symbols is stopped even if the output of the random number data read only memory 812 is obtained. The comparator 815 provides the low level output when the number of moving symbols being presently displayed is smaller than the number to be displayed for movement (i.e. in the case of A≦B).

The clock CL1 is applied to the clock input terminal of the D-type flip-flop 816. The clock CL2 is applied to the clock input terminal of the D-type flip-flop 817. The OR gate 818 is supplied with the signal for commanding the display of the moving symbol segments S10 and S12 (i.e. the set outputs Q10 and Q12 of 830 and 832 to be described below) to stop driving the display of the moving symbol segments in succession in the case where the data stored in the random number data read only memory 812 is the logic one continually for two addresses. For the same reason, the OR gate 819 is supplied with the signal for commanding display of the moving symbol segments S20 and S22 (i.e. the set outputs Q20 and Q22 of 830' and 832'). The D-type flip-flop 816 provides the same logic from the set output terminal (Q) as the information being applied to the data input terminal (D) at each application of the clock CL1 and the same is applied to the data input terminal of the D-type flip-flop 830 shown in FIG. 8B as the signal for commanding display of the moving symbol segment S10. Likewise, the D-type flip-flop 817 provides from the set output terminal (Q) the logical state of the data input terminal (D) at each application of the clock CL2 and the same is applied to the data input terminal of the D-type flip-flop 830' to be described below as the signal for commanding display of the moving symbol segment S20.

FIG. 8B is a schematic diagram of the moving symbol display control circuit 80B. Although only the display control circuit of the moving symbol display region S1 is shown, the circuit for controlling display of the moving symbol display region S2 may also be structured in the same manner. However, since the input and output signals are different, the input and output signals corresponding to the moving symbol display region S2 are shown in the figure in the parenthesis. Note that in the following description, the same reference numerals with prime are used to denote the same circuit portions of the moving symbol display region S2.

Referring to FIG. 8B, the D-type flip-flops 830 to 839 are provided to correspond to the respective moving symbol segments S10 to S19. The respective D-type flip-flops 830 to 839 each have the set output (Q) of the preceding stage connected to the data input terminal (D) of the succeeding stage and the respective clock input terminals (C) commonly connected to receive the above described clock CL1. The respective D-type flip-flops 830 to 832, 834, 835 and 837 to 839 are also connected to commonly receive the signal RESET at the reset input terminals. The D-type flip-flops 833 and 836 are connected to receive the output of the corresponding OR gates 841 and 842. One input of each of the OR gates 841 and 842 is connected to receive the signal RESET. The other input of the OR gate 841 is connected to receive the set output of the D-type flip-flop 843. The other input of the OR gate 842 is connected to receive the output of the D-type flip-flop 844. The D-type flip-flop 843 is connected to receive at the data input terminal an inverted signal of the signal for commanding display of the fixed symbol segment S31 (i.e. the reset output Q31 of 851 shown in FIG. 8C to be described below) and is also connected to receive at the clock input terminal the signal for commanding display of the moving symbol segment S13 lying at the upper position of the fixed symbol segment S31 (i.e. the set output Q13 of 833). The D-type flip-flop 844 is also connected to receive at the data input terminal an inverted signal of the signal for commanding display of the fixed symbol segment S32 (i.e. the reset output Q32 of 852 shown in FIG. 8C to be described subsequently) and is also connected to receive at the clock input terminal the signal for commanding display of the moving symbol segment S16 corresponding to the upper position of the moving symbol segment S32 (i.e. the set output Q16 of 836). The set outputs of the D-type flip-flops 843 and 844 are applied to the OR gate 845 as the signals MS1 and MS2 representing failure.

Although not shown, the OR gate 845 is supplied with a detected signal representing the state in which the fixed symbol segment S33 or S34 is not displayed, i.e. the signals MS3 and MS4 representing failure at the time when the moving symbol segment S26 or S23 is displayed from the moving symbol driving circuit for controlling display of the moving symbol display region S2. The output of the OR gate 845 is applied as a signal for enabling the timer 846 and is also applied to the counter 847. The timer 846 provides the time up output to the reset input terminals of the D-type flip-flops 843 and 844 to stop the display after the failure symbol segments S61 to S64 corresponding to the positions of failure are driven for display for a predetermined time period after the failure occurred. The counter 847 counts the pulses being applied from the OR gate 845 and provides the signal to drive the display of the symbol segments 241 to 243 corresponding to the number of failures based on the count value. When the counter 847 reaches the count of three by detecting the third failure, the same provides the signal OVER representing the end of the game.

Referring to FIG. 8C, the details of the fixed symbol display control circuit 80C will be described. The flip-flops 851 to 854 are set responsive to depression of the corresponding operation switches 131 to 134 and the set outputs are applied to the multiplexer 850 as the signal for commanding display of the corresponding fixed symbol segments S31 to S34. The reset input terminals of the respective flip-flops 851 to 854 are supplied with the outputs of the corresponding OR gates 855 to 858 which reset flip-flops when the operation switches for setting the flip-flops other than the corresponding flip-flops are depressed.

The multiplexer 850 is supplied with the count value in the 4-nary counter 859. The 4-nary counter 859 sequentially advances the count value from 0 to 3 each time a one second clock is applied and repeats the count operation starting again from thereof after each circulation. The multiplexer 850 sequentially and repetitively drives the fixed symbol segments S31, S32, S33 and S34 for display based on the count value in the 4-nary counter 859 when the signal TM representing the timepiece mode is applied and drives any one of the respective fixed symbol segments S31 to S32 for display based on the set output of the respective flip-flops 851 to 854 when the signal TM is not applied. The symbol segments S51 to S54 corresponding to the respective fixed symbol segments S31 to S34 are preferably driven for display simultaneously.

FIG. 9 is a schematic diagram of the point score information generating circuit 90. The OR gate 91 is connected to receive the signals (i.e. Q14, Q17, Q24, and Q27) for commanding display of the moving symbol segments S14, S17, S24 and S27. The fact that these moving symbol segments S14, S17, S27 and S24 are displayed means a case where any one of the operation switches 131 to 134 is operated by a player to display any one of the fixed symbol segments S31, S32, S33 and S34 corresponding to these moving symbol segments at the time when any one of the moving symbol segments S13, S16, S26 and S23 is displayed, in other words, a case where the moving symbol does not fall into a manhole. In such a case, the high level output from the OR gate 91 is applied to the point score counter 92. The point score counter 92 is reset when the signal RESET is applied and counts the pulses from the OR gate 91 as a score point. The score point information counted in the score point counter 92 is applied to the multiplexer 93 and the comparator 94 and the best score storing memory 95. The memory 95 comprises a storing area 95a for storing the best score of game A and the storing area 95b for storing the best score of game B, in which the storing region 95b is designated when the signal GB is the high and storing region 95a is designated when the signal GB is low. The memory 95 is also supplied with the write enabling signal W (say, the high level) or the read enabling signal R (say, the low level) from the comparator 94. The best point score information stored in the memory 95 is applied to the comparator 94 and the multiplexer 93. The comparator 94 compares the point score information obtained from the score point counter 92 with the best score obtained from the memory 95, thereby rewriting the score by applying the write signal to the memory 95 when the point score information exceeds the best score so far attained. The multiplexer 93 provides the best score information when the high level is obtained from the OR gate 96, i.e. either the start switch 121 or 122 is depressed. On the other hand, the multiplexer 93 provides the point score information when the output from the OR gate 96 is the low level and the output thereof is applied to the display/alarm control circuit 70.

Referring to FIGS. 1 to 9, the specific operations of the embodiment shown will be described.

(1) Game Mode

First the operation in the case where game A is played using the timepiece apparatus 10 having a game function of the embodiment shown will be described. In such a case, a player depresses the start switch 121. At the start of depression of the start switch 121 the differentiating circuit 43 provides the signal RESET. The RESET initially resets the D-type flip-flops 830 to 839 (830' to 839'), and also resets the point score counter 92. During the time period of depression of the start switch 121, the OR gate 96 provides the high level, which is applied to the multiplexer 93. Therefore, the multiplexer 93 provides the best score information to the multiplexer 711. The best score information is applied to the multiplexer 713 by means of the multiplexer 711 and is applied to the decoder/driver 715 by means of the multiplexer 713. Accordingly, the decoder/driver 715 causes the numerical value information display portion 21 to display the best score information during the depression period of the start switch 121. After depression of the start switch 121, the set output of the flip-flop 411 is applied to the read only memory 54. Accordingly, the numerical value information stored in the address corresponding to the point score information out of the address regions of the high order is read from the read only memory 54 and is applied to the comparator 55. The comparator 55 provides the pulse of the period in reverse proportion to the numerical value information from the read only memory 54, which is applied through the AND gate 571 and the OR gate 58 to the clock input terminal of the D-type flip-flop 59. As a result, the D-type flip-flop 59 provides alternately the clock CL1 or CL2 of the high level from the set output terminal and the reset output terminal upon each application of the clock.

The above described clock CL1 is applied to the clock input terminals of the D-type flip-flops 816 and 830 to 839. When the read only memory 812 provides the high level (or the logic one) at that time, the D-type flip-flop 816 provides the high level from the set output terminal. The set output is applied to the data input terminal of the D-type flop-flop 830 as the signal for commanding display of the moving symbol segment S10 for representing the start point. At the time when the following clock CL1 is generated the D-type flip-flop 830 stores the signal at the data input terminal, i.e. the high level, and provides the high level as the set output Q11, which is applied to the moving symbol segment S10 and is also applied to the data input terminal of the D-type flip-flop 831. As a result, the moving symbol segment S10 is driven for display.

Then at the time when the following clock CL1 is applied, the D-type flip-flop 831 stores the high level being applied to the data input terminal and provides the high level from the set output terminal. Since the low level has been supplied to the data input terminal of the D-type flip-flop 831 at the time, the set output Q11 of the D-type flip-flop 831 goes low. Since the D-type flip-flop 816 has been supplied with the high level as the reset input from the OR gate 818 for the purpose of preventing the moving symbol from being continually displayed, the output from the read only memory 812 is brought to the low level even if the high level is obtained therefrom. Accordingly, the D-type flip-flop 830 provides the low level output. Thus, each time the clock CL1 is withdrawn, the D-type flip-flops 830 to 839 withdrawing the high level are shifted in succession, whereby any one of the respective moving symbol segments S10 to S19 is driven in succession for display. However, in such a state the number of moving symbol being displayed is only one.

In the case where any one of the moving symbol segments S10 to S19 of the moving symbol display region S1 is driven in succession for display, it is necessary to display the fixed symbol segment S31 at the time when the moving symbol segment S13 is driven for display or immediately before the same is driven for display. In such a case, a player depresses the operation switch 131. The flip-flop 851 is set responsive to depression of the operation switch 131 and the flip-flops 852 to 854 corresponding to the other operation switches 132 to 134 are reset. The set output of the flip-flop 851 is applied to the multiplexer 850. Since the multiplexer 850 has not been supplied with the signal TM at that time, the fixed symbol segment S31 corresponding to the flip-flop 851 which has been withdrawing the high level is driven for display. Since the reset output of the flip-flop 851 is low, the D-type flip-flop 843 does not provide the high level from the set output terminal.

When a player succeeds in displaying the fixed symbol segment S31 before the moving symbol segment S13 is driven for display, the D-type flip-flop 834 provides the set output (Q14) of the high level at the time when the next clock CL1 is applied. The set output (Q14) is applied to the moving symbol segment S14 to drive the same for display and is also applied to the point score counter 92 through the OR gate 91. The point score counter 92 is responsive to the input pulse from the OR gate 91 to increment the count value by one, thereby counting the point score in one game. The point score counted by the point score counter 92 is applied to the decoder/driver 715 through the multiplexers 93, 711 and 713 and is displayed by the numerical value information display portion 21.

Likewise, each time the clock CL1 is applied, the moving symbol segments S15 to S19 are driven in succession for display. The player plays the game by depressing the operation switch 132 before the moving symbol segment S16 is driven for display. Accordingly, the flip-flops 851, 853 and 854 are reset and the flip-flop 852 is set. The multiplexer 850 is responsive to the set output of the flip-flop 852 to drive the fixed symbol segment S32 for display. Therefore, when the D-type flip-flop 836 provides the high level output from the set output terminal, i.e. at the timing when the moving symbol segment S16 is driven for display, the D-type flip-flop is not supplied with the high level from the reset output terminal of the flip-flop 852 and hence switches the set output to the low level. At the time when the next clock CL1 is applied, the D-type flip-flop 837 provides the high level output from the set output terminal, thereby driving the moving symbol segment S17 for display. Since the set output of the D-type flip-flop 837 is applied to the point score counter 92 through the OR gate 91 at that time, the score is incremented by one. Thus, the moving symbol segments S10 to S19 of the moving symbol display region S1 are driven for display in succession at the period of the clock CL1 and as a result the moving symbol is displayed as if the same is moving. At that time, if the player succeeds in operating the operation switch 131 or 132 so as to display the fixed symbol S31 or S32 immediately before the moving symbol segment S13 or S16 is driven for display, a point is awarded.

In the above described display control operation, the AND gates 731 and 732 intermittently provide the signals of the frequencies of 1.5 kHz and 1 kHz each time the clocks CL1 and CL2 are generated, which are then applied through the OR gate 727 to the piezoelectric vibrator 728. As a result, the piezoelectric vibrator 728 provides a sound of a short interval at each display of apparent movement of the respective moving symbols in the moving symbol display regions S1 and S2.

However, if the fixed symbol segment S31 has not been driven for display at the time when the moving symbol segment S13 is driven for display, the reset output ($\bar{Q}31$) of the flip-flop remains high. Therefore, the D-type flip-flop 843 stores the reset output of the flip-flop 851 at the time when the moving symbol segment S13 is driven for display and provides the high level (MS1) from the set output terminal. The set output (MS1) is applied to the reset input of the D-type flip-flop 833 through the OR gate 841. Therefore, the D-type flip-flop 833 switches the set output thereof to the low level. Thus, unless the fixed symbol segment representing a manhole is driven for display, it follows that a human displayed by the moving symbol segment S13 falls into the hole. The set output of the D-type flip-flop 843 drives the symbol segment S61 for display, representing the failure. The set output of the D-type flip-flop 843 is applied through the OR gate 845 to the counter 847, whereby the count value is incremented by one, thereby inabling the operation of the counter 847. As a result, the count value of the counter 847 becomes one and the symbol segment 241 is driven for display. the Timer 846 provides the output after the lapse of a predetermined time period after the failure, thereby to resetting the D-type flip-flop 843. As a result, the symbol segment S61 is disabled.

In the foregoing description the embodiment was described such that the number of the moving symbol being displayed by the moving symbol display region S1 is only one for the purpose of simplicity of description; however, it follows that two or more moving symbol segments are driven for display simultaneously if the set output is provided from the D-type flip-flop 816 during a time period after the moving symbol segment S10 is driven for display until the moving symbol segment S19 is driven for display. However, in order to avoid a situation in which the moving symbols are continually displayed, the set outputs (Q10 and Q12) of the D-type flip-flops 830 and 832 are applied to the reset input of the D-type flip-flop 816 through the OR gate 818.

If the data concerning the number of the moving symbols being actually displayed in the moving symbol display region S1 obtained from the encoder 814 becomes larger than the data concerning the number being displayed read out from the read only memory 813, the high level output obtained from the comparator 815 is applied to the reset input of the flip-flop 816 through the OR gate 818. Therefore, the D-type flip-flop 816 does not provide the high level output from the set output terminal even if the high level output is obtained from the read only memory 812 and accordingly does not drive the moving symbol segment S10 for display segment S10 for representing the start point.

In the foregoing description the embodiment was described such that the respective moving symbols in the moving symbol display region S1 are driven for display; however, since the clocks CL2 and CL1 are alternately obtained, the respective moving symbols in the lower stage moving symbol display region S2 are driven for display in succession. The operation in such a case is the same as that in driving the respective moving symbols for display in the moving symbol display region S1 and therefore a more detailed description thereof will be omitted.

If three failures occur while the respective moving symbol segments S10 to S19 and S20 to S29 are driven in succession for display as described above, the count value in the counter 847 becomes three, whereby the signal OVER is obtained. The timer 46 is responsive to the signal OVER to start the operation thereof, whereby the flip-flops 411 and 412 are reset. After a predetermined time period thereafter, the high level output is obtained from the timer 46 and the same is applied through the OR gate 422 to the flip-flop 413 to reset the same. As a result, the timepiece apparatus 10 having a game function is switched to the timepiece mode.

(2) Alarming Time Setting Mode

In setting an alarming time, first the alarming time setting switch 15 is depressed once. Accordingly, the flip-flop 415 is set. The set output and the depression signal of the alarming time setting switch 15 are applied to the AND gate 44. Accordingly, the high level output is obtained from the AND gate 44 and is applied to the clock input terminal of the D-type flip-flop 45. Since the D-type flip-flop 45 has been supplied with the reset output at the data input terminal, the set output thereof becomes high upon the first depression of the alarming time setting switch 15 and the signal ALS is obtained. The set output of the flip-flop 415, i.e. the signal ASET, enables the AND gates 646 and 647. The operation switch 131 and/or 132 is the depressed. During the depression of the operation switch 131 the AND gate 649 provides the quick advancing clock, which is applied through the AND gate 647 to the 12-nary counter 623. The 12-nary counter 623 increments the count value by one at each application of the quick advancing clock and, when twelve quick advancing clocks are applied, provides the high level, which is applied to the binary counter 624. Thus the hour counter 62h is brought to the hour unit of the time when an alarm is to be caused and the count value is applied to the multiplexer 711.

The multiplexer 711 is responsive to the signal ASET representing the alarming time setting mode being applied through the OR gate 712 to provide the alarming time information set in the hour counter 62h and the minute counter 62m, which is applied to the multiplexer 713. The multiplexer 713, in response to the signal ASET, provides the output of the multiplexer 711 to the decoder/driver 715. Accordingly, the decoder/driver 715 causes the numerical value information display portion 21 to display the alarming time. At that time, the player looks at the time displayed by the numerical value display portion 21 and releases the previously depressed switch 131 when the hour unit of the desired time (when an alarm is to be caused) is reached.

Likewise, during depression of the operation switch 132 the AND gate 648 provides the quick advancing clock, which is applied through the AND gate 646 to the decimal counter 621. The decimal counter 621 increments the count value at each application of the quick advancing clock and upon counting of ten clocks the high level output is obtained and is applied to the 6-nary counter 622. When the time, in terms of minute units being displayed by the numerical information display portion 21 becomes the minute unit of the time when an alarm is to be caused, the previously depressed operation switch 132 is released. Thus, the desired time information when an alarm is to be caused is set in the hour counter 62h and the minute counter 62m. In the case where it is desired that an alarm is caused both in a visible and audible manner when the desired alarming time is reached, the time information calling switch 16 is depressed. Accordingly, the flip-flops 414 and 415 are reset and the flip-flop 413 is set. As a result, the apparatus is switched to the timepiece mode.

Meanwhile, in the case where it is not desired that an alarm is caused in a visible or audible manner even when the desired alarming time is set and such time is reached, the alarming time setting switch 15 is depressed again. Since the set output ($\overline{Q}$) of the D-type flip-flop 45 is the high level and the reset output (Q) of the same is low at that time, the logical state of the reset output thereof, i.e. the low level, is obtained from the set output terminal upon application of the high level from the AND gate 44 to the clock input terminal. Accordingly, the signal ALS becomes low and it follows that the alarming time is only stored and no alarm is caused even at the alarming time.

(3) The Operation in the Timepiece Mode

In the case where the set output of the flip-flop 413 is high and the timepiece mode is selected, the following operation is performed. More specifically, the current time information being measured by the hour counter 61h and the minute counter 61m is normally applied to the multiplexer 711. The multiplexer 711, in response to the low level output from the OR gate 712, provides the current time information to the multiplexer 713. The multiplexer 713 in response to the signal TM of the high level being applied through the OR gate 714, provides the output of the multiplexer 711 to the decoder/driver 715. The decoder/driver 715 causes the numerical value information display portion 21 to display the current time information being applied from the multiplexer 713.

On the other hand, in the timepiece mode the AND gate 572 included in the clock signal generating circuit 50 is enabled and the AND gate 571 is disabled. Therefore, the AND gate 572 provides the second clock, which is applied through the OR gate 58 to the D-type flip-flop 59. Accordingly, at each application of the second clock the D-type flip-flop 59 alternately provides the clocks CL1 and CL2 from the set output terminal and the reset output terminal thereof. More specifically, the clocks CL1 and CL2 become high at different phases, whereby the period becomes a two second interval.

When the D-type flip-flop 816 provides the high level output from the set output terminal, the D-type flip-flop 830 provides the high level output from the set output terminal at the time when the clock CL1 is obtained. The moving symbol segment S10 is responsive to the said set output to be driven for display. At the time when the clock CL2 is obtained, the high level output is obtained from the set output terminal (Q21) of the D-type flip-flop 830' corresponding to the moving symbol display region S2 and the moving symbol segment S20 is driven for display. Likewise thereafter, at each application of the clock CL1 the moving symbol segments S11 to 19 are driven in succession for display. At each application of the clock CL2 the moving symbol segments S21 to S29 are driven in succession for display. Even in such a case it is necessary to drive for display the respective fixed symbol segments S31, S34, S32 and S33 corresponding thereto. Therefore, the multiplexer 850 is responsive to the count value being applied from the 4-nary counter 859 to drive in succession for display the fixed symbol segments S31, S34, S32, S33 when the signal TM is applied.

When the alarming time is reached in the alarm mode, i.e. while the D-type flip-flop 45 has been set and the signal ALS is obtained, the above described symbol segment 250 has been driven for display. Although the D-type flip-flop 725 is supplied with the second clock at the clock input terminal at that time, since the low level of the output of the AND gate 722 has been turned to the high level and applied as the reset input, the high level output is continually obtained from the reset output terminal. Therefore, the AND gate 723 continually drives the symbol segment 252 for display.

(4) Alarming Mode

The above described comparator 721 has been supplied with the current time information and the alarming time information. Normally the comparator 721 compares both inputs; however, when the current time reaches the alarming time, the high level output is obtained therefrom and is applied to the AND gate 722. The high level output from the comparator 721 is inverted by the inverter 72b, thereby forcibly releasing the flip-flop 72a from being set. At that time the AND gate 729 has kept output level high. Therefore, the AND gate 722 provides the high level output, which is applied to the AND gate 724 as one input thereto and also releases the reset state of the D-type flip-flop 725. Accordingly, upon each application of the second clock, the D-type flip-flop 725 alternately provides the high level output from the set output terminal and the reset output terminal, thereby to alternately drive for display the symbol segments 251 and 252. As a result, when the alarming time is reached, a human symbol represented by the symbol segment 250 is displayed, apparently swinging a bell. At that time the AND gate 724 has been supplied with the high level which is an inversion of the signal GC of the low level. Therefore, when the alarming time is reached in the timepiece mode, the AND gate 724 provides the signal of the frequency of 2 kHz to the AND gate 726. Upon each application of the second clock the AND gate 726 provides the signal of the frequency of 2 kHz, which is applied to the piezoelectric vibrator 728. As a result, the piezoelectric vibrator 728 is vibrated, whereby a sound is produced intermittently at one second intervals.

If it is desired to stop the alarm, the time information calling switch 16 is depressed. Accordingly, the flip-flop 72a is reset and the AND gate 729 is disabled, whereby the alarm in an audible manner and a visible manner is stopped.

On the other hand, if the current time reaches the alarming time during the game, the reset state of the D-type flip-flop 725 is released by the high level output from the AND gate 722; however, the AND gate 724 is disabled by the signal GC of the high level. Therefore, although the alarm in an audible manner is not produced, the symbol segments 251 and 252 are alternately driven for display, whereby the alarm is continually caused in a visible manner.

Thus, even when the alarming time is reached during a game, an alarm is continually caused in a visible manner without the audible alarm being sounded and as a result the player can continue to play the game without being interrupted by the audible alarm and without having to depress the time information calling switch 16 to stop the the sound alarm.

In the case where the D-type flip-flop 45 has been reset and the signal ALS has become low, an alarm is not caused in either an audible or a visible manner.

Although in the foregoing, the embodiments were described as implemented using hardware circuit components, the present invention is not limited thereto and the same can be implemented using software. In such a case, a microprocessor is employed and a read only memory for storing an operation program in advance for driving for display the respective symbol segments and for operation in conjunction with an alarming time, whereby proper processing is performed in accordance with such program to perform the same in accordance with software.

Thus, according to the present invention, a timepiece apparatus having a game function both providing a game function and an alarm function is provided, in which both display of the current time and display of a game can be performed, while an alarm can be raised at a desired alarming time. Since such a timepiece apparatus having a game function of versatility is likely to attract the interest of consumers, the same could be widely utilized.

Although the present invention has been described and illustrated in detail, it is clear that the same is by way of illustration and example only and is not to be taken by way of limitation, the spirit and scope of the present invention being limited only by the terms of the appended claims.

What is claimed is:

1. A timepiece apparatus having a game function comprising: game associated information generating means for generating game associated information for use in playing a game, current time information generating means for generating current time information, display means including game associated information display means for displaying at least a figure and for displaying said game associated information from said game associated information generating means, and numerical value information display means for displaying a numerical value and for displaying at least said current time information from said current time information generating means, mode selecting means for selecting the display mode to be performed by said display means to be either one of a game mode for displaying said game associated information and a timepiece mode for displaying said current time information, display control means for controlling said game associated information display means to display said game associated information from said game associated information generating means when said game mode is selected by said mode selecting means and for controlling said numerical information display means to display said current time information from said current time information generating means when said timepiece mode is selected by said mode selecting means, time setting means for setting a desired alarming time when an alarm is to be caused, storing means for storing said desired alarming time as set by said time setting means, alarm means for causing an alarm, alarm driving means for driving said alarm means responsive to said current time information from said current time information generating means reaching said desired alarming time stored in said storing means, said alarm means comprising audible alarm means for causing an audible alarm and visible alarm means for causing a visible alarm, said alarm driving means comprising audible alarm signal generating means for generating an audible alarm signal for driving said audible alarm means, visible alarm signal generating means for generating a visible alarm signal for driving said visible alarm means, said alarm driving means comprising means for disabling said audible alarm signal generating means when said game mode is selected by said mode selecting means, and for enabling at least one of said audible alarm signal generating means and said visible alarm signal generating means when said timepiece mode is selected by said mode selecting means, and wherein said visible alarm causing means form part of said display means.

2. The timepiece apparatus of claim 1, wherein said visible alarm causing means comprises one display portion, and said visible alarm signal generating means comprises blinking display signal generating means for generating a display signal for energizing said display portion in a blinking manner.

3. The timepiece apparatus of claim 1, wherein said visible alarm causing means comprises a plurality of display portions, and said visible alarm signal generating means comprises means for generating a signal for driving said plurality of display portions in a sequential manner.

4. A timepiece apparatus of claim 1, wherein said display means comprises liquid crystal display means.

5. The timepiece apparatus of claim 1, wherein said game associated information display means comprises a first symbol display region including a plurality of first kind symbol segments, a second symbol display region being driven for display independently of said first symbol display region and including a second kind symbol segment, wherein said game associated information generating means comprises game display driving signal generating means for generating a signal for selectively driving for display at least one of said first kind symbol segments of said first symbol display region, and game operation means for selectively driving for display said second kind symbol segment in said second symbol display region.

6. The timepiece apparatus of claim 5, wherein said current time information generating means comprises timing means for timing said current time information, and time correcting means operatively coupled to said timing means for correcting said current time information.

7. The timepiece apparatus of claim 5, wherein said time correcting means and said game operation means comprise common means, and wherein said mode selecting means comprises selective enabling means for enabling the game operation means to operate upon said game associated information generating means when said game mode is selected and for enabling said game operation means to operate upon said timing means when said timepiece mode is selected.

8. The timepiece apparatus of claim 5, wherein said alarm means comprises audible alarm causing means for causing an alarm in an audible manner, said alarm driving means comprises audible alarm signal generating means for generating an audible alarm signal for driving said audible alarm causing means, wherein said game associated information generating means comprises game sound signal generating means for generating a game sound signal for producing a game sound each time the display state of said first kind symbol segments is changed by said game display driving signal generating means, and wherein said audible alarm causing means comprises sound producing means for producing an alarm sound or a game sound responsive to said audible alarm signal or said game sound signal, respectively.

9. The timepiece apparatus of claim 5, wherein said mode selecting means is further adapted to select an alarming time setting mode for setting an alarming time when an alarm is to be caused, wherein said time setting means and said game operation means comprise common means, wherein said storing means is further adapted to store said alarming time being entered through operation of said game operation means responsive to selection of said alarming time setting mode by said mode selecting means, and wherein said display control means is further adapted for controlling said numerical value information display means to display said alarming time stored in said storing means when said alarming time setting mode is selected.

10. The timepiece apparatus of claim 5, wherein said second kind symbol segment comprises a plurality of segments, and wherein said game operation means is adapted to select any one of said plurality of second kind symbol segments by operation thereof.

11. The timepiece apparatus of claim 5 or 11, wherein said time setting means and said game operation means comprise common means.

12. The timepiece apparatus of claim 10, wherein said plurality of second kind symbol segments are arranged in a predetermined relationship with respect to said plurality of first kind symbol segments, and wherein said game associated information generating means comprises determining means for determining that the display state of said second kind symbol segments and the display state of said first kind symbol segments are in a predetermined relationship relative to each other.

13. The timepiece apparatus of claim 12, wherein said game associated information generating means comprises point score calculating means responsive to a determination of said predetermined relationship by said determining means for calculating a point score of a game.

14. The timepiece apparatus of claim 13, wherein said display control means comprises point score display control means responsive to said mode selecting means for controlling said numerical value information display means to display said point score when said game mode is selected.

* * * * *